(12) United States Patent
Arnold

(10) Patent No.: US 6,419,464 B1
(45) Date of Patent: Jul. 16, 2002

(54) VANE FOR VARIABLE NOZZLE TURBOCHARGER

(75) Inventor: Steven Don Arnold, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/761,277

(22) Filed: Jan. 16, 2001

(51) Int. Cl.[7] ............... F04B 17/00; F01D 17/12
(52) U.S. Cl. ............... 417/407; 415/160; 415/164; 415/163; 415/159; 60/602
(58) Field of Search ............... 415/150, 159, 415/160, 163, 166, 164, 165; 417/407; 60/602

(56) References Cited

U.S. PATENT DOCUMENTS

| | | | | |
|---|---|---|---|---|
| 2,392,200 A | * | 1/1946 | Thompson | 415/163 |
| 2,904,817 A | * | 9/1959 | Brennan | 415/163 |
| 2,976,013 A | * | 3/1961 | Hunter | 415/164 |
| 3,495,921 A | * | 2/1970 | Swearingen | 415/163 |
| 4,502,836 A | * | 3/1985 | Swearingen | 415/150 |
| 4,657,476 A | * | 4/1987 | Berg | 415/164 |
| 4,770,603 A | * | 9/1988 | Engels et al. | 415/164 |
| 4,804,316 A | * | 2/1989 | Fleury | 417/407 |
| 5,931,636 A | * | 8/1999 | Savage et al. | 415/160 |
| 6,269,642 B1 | | 8/2001 | Arnold et al. | 60/602 |

* cited by examiner

Primary Examiner—Thomas Denion
Assistant Examiner—Thai-Ba Trieu
(74) Attorney, Agent, or Firm—Ephraim Starr; Felix Fischer

(57) ABSTRACT

A vane and post arrangement for a variable geometry turbocharger employs vanes having a hole in a first end surface receiving a post extending from a surface of the nozzle in the turbine housing. A second end surface on each vane incorporates an extending tab which is received in a respective slot in a unison ring for rotation of the vanes on the posts upon movement of the unison ring.

4 Claims, 5 Drawing Sheets

VANE FOR VARIABLE NOZZLE TURBOCHARGER

FIELD OF THE INVENTION

This invention relates generally to the field of variable geometry turbochargers and, more particularly, to an improved vane design for a plurality of pivoting aerodynamic vanes disposed within a turbine housing of a variable nozzle turbocharger to provide improved vane operation and extended vane/turbocharger service life.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft and housed in a compressor housing. Thus, rotary action of the turbine also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

In a turbocharger it is often desirable to control the flow of exhaust gas to the turbine to improve the efficiency or operational range of the turbocharger. Variable geometry turbochargers have been configured to address this need. A type of such variable geometry turbocharger is one having a variable exhaust nozzle, referred to as a variable nozzle turbocharger. Different configurations of variable nozzles have been employed in variable nozzle turbochargers to control the exhaust gas flow. One approach taken to achieve exhaust gas flow control in such variable nozzle turbochargers involves the use of multiple pivoting vanes that are positioned annularly around the turbine inlet. The pivoting vanes are commonly controlled to alter the throat area of the passages between the vanes, thereby functioning to control the exhaust gas flow into the turbine.

In order to ensure the proper and reliable operation of such variable nozzle turbochargers, it is important that the individual vanes be configured and assembled within the turbine housing to move or pivot freely in response to a desired exhaust gas flow control actuation. Because these pivoting vanes are subjected to millions of high temperature cycles during turbocharger operation it is necessary that any such pivoting mechanism be one that is capable of repeatably functioning under such cycled temperature conditions without enduring any cycled temperature related material or mechanical problem or failure.

Known multiple vane variable nozzle turbochargers include vanes that are each configured having a shaft projecting outwardly therefrom, each such shafted being positioned within a respective shaft opening in a turbine housing or nozzle wall. While the vanes are commonly actuated to pivot vis-a-vis their shafts within the respective openings, it has been discovered that such conventional vane attachment and pivoting mechanism is not without its problems.

For example, in order to ensure freely pivoting movement of the vane shaft with the opening it is essential that the shaft project perfectly perpendicularly from the vane, to thereby avoid undesired binding or otherwise impairment of the vane pivoting movement. Secondary straightening or machining operations are sometimes necessary to ensure the perpendicularity of the vane shafts., which secondary operations can be both time consuming and costly. Additionally, this type of vane attachment and pivoting mechanism can produce a high cantilevered load on the vane shaft when actuated that can also impair free vane pivoting movement, and that can ultimately result in a vane material or mechanical failure.

It is, therefore, desirable that a vane pivoting mechanism be constructed, for use with a variable nozzle turbocharger, in a manner that provides improved vane operational reliability when compared to conventional vane pivoting mechanisms.

SUMMARY OF THE INVENTION

A variable geometry turbocharger incorporating the present invention includes a turbine housing having an inlet for exhaust gas and an outlet, a volute connected to the inlet, and an integral outer nozzle wall adjacent the volute. A turbine wheel is carried within the turbine housing and attached to a shaft. A plurality of vanes are disposed within the turbine housing, each vane having a hole extending into the vane through an axial vane surface substantially parallel to the outer nozzle wall, each vane hole receiving a respective post projecting outwardly from the outer nozzle wall, the vanes further having actuation tabs extending from an axial vane surface opposite from the holes. An annular unison ring is positioned axially adjacent the vanes, the unison ring having a plurality of slots that each accommodate a respective tab therein. Te unison ring is rotated to effect movement of the tabs within respective slots by pivoting movement of the vanes on the posts, wherein such movement of the tabs within the slots causes the vanes to move radially relative to the turbine wheel shaft.

BRIEF DESCRIPTION OF THE DRAWINGS

The invention will be more clearly understood with reference to the following drawings wherein.

DETAILED DESCRIPTION OF THE INVENTION

A variable geometry or variable nozzle turbocharger generally comprises a center housing having a turbine housing attached at one end, and a compressor housing attached at an opposite end. A shaft is rotatably disposed within a bearing assembly contained within the center housing. A turbine or turbine wheel is attached to one shaft end and is carried within the turbine housing, and a compressor impeller is attached to an opposite shaft end and is carried within the compressor housing. The turbine and compressor housings are attached to the center housing by bolts that extend between the adjacent housings.

Figure 1:
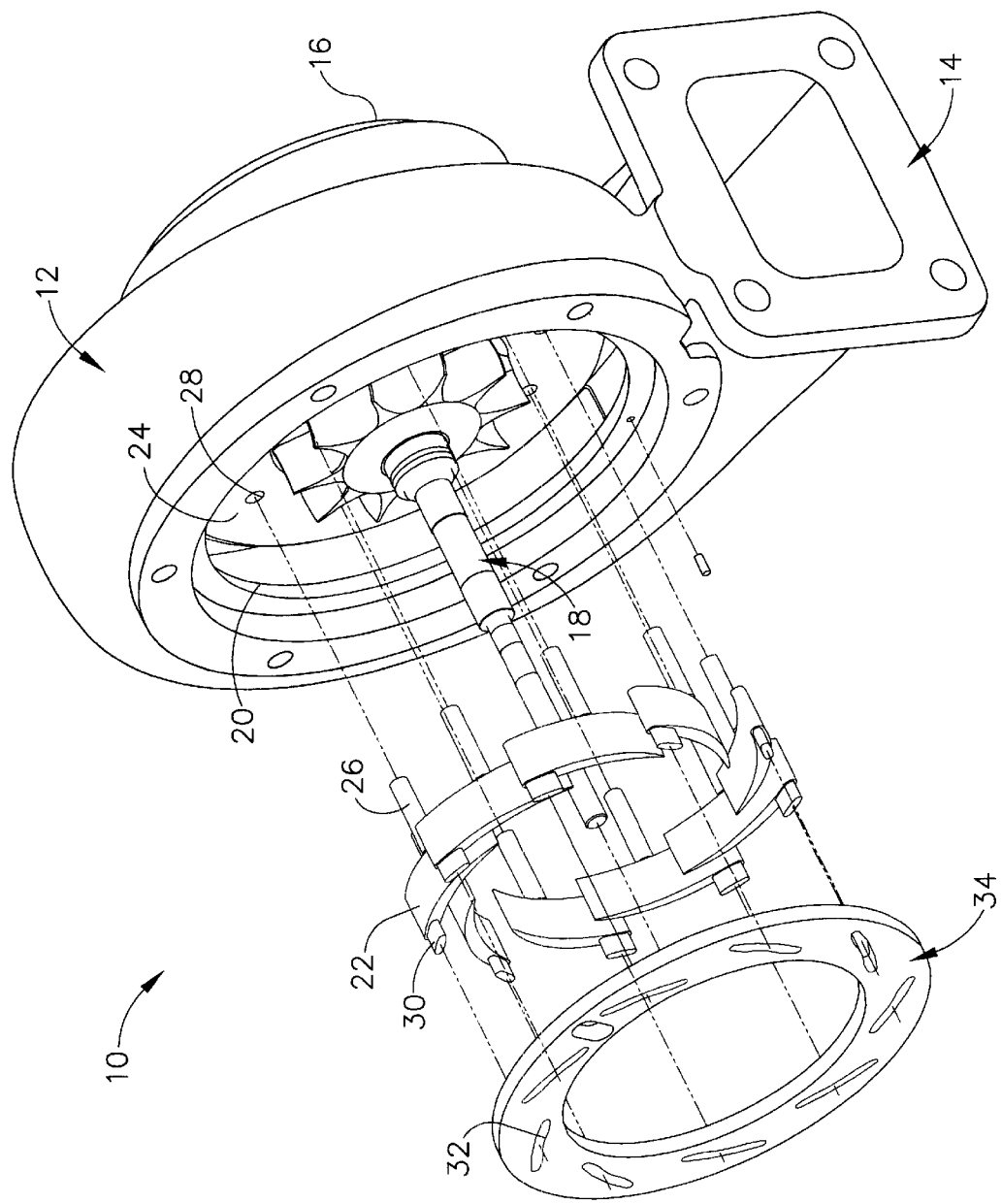
FIG. 1 is an exploded isometric view of a turbine housing for a variable geometry turbocharger employing conventional vanes.

FIG. 1 illustrates a portion of a known variable nozzle turbocharger 10 comprising a turbine housing 12 having a standard inlet 14 for receiving an exhaust gas stream, and an outlet 16 for directing exhaust gas to the exhaust system of the engine. A volute is connected to the exhaust inlet and an integral outer nozzle wall is incorporated in the turbine housing casting adjacent the volute. A turbine wheel and shaft assembly 18 is carried within the turbine housing. Exhaust gas, or other high energy gas supplying the turbocharger, enters the turbine through the inlet and is distributed through the volute in the turbine housing for substantially radial entry into the turbine wheel through a circumferential nozzle entry 20.

Multiple vanes 22 are mounted to a nozzle wall 24 machined into the turbine housing using shafts 26 that project perpendicularly outwardly from the vanes. The shafts 26 are rotationally engaged within respective openings 28 in the nozzle wall. The vanes each include actuation tabs 30 that project from a side opposite the shafts and that are engaged by respective slots 32 in a unison ring 34, which acts as a second nozzle wall.

An actuator assembly is connected with the unison ring and is configured to rotate the ring in one directed or the other as necessary to move the vanes radially, with respect to an axis of rotation of the turbine wheel, outwardly or inwardly to respectively increase or decrease the flow of exhaust gas to the turbine. As the unison ring is rotated, the vane tabs 30 are caused to move within their respective slot 32 from one slot end to an opposite slot end. Since the slots are oriented with a radial directional component along the unison ring, the movement of the vane tabs within the respective slots causes the vanes to pivot via rotation of the vane shafts within their respective openings and open or close the nozzle area depending on the unison ring rotational direction. An example of a known variable nozzle turbochargers comprising such elements is disclosed in U.S. patent application Ser. No. 09/408,694 filed Sep. 30, 1999 entitled VARIABLE GEOMETRY TURBOCHARGER, having a common assignee with the present application, which is incorporated herein by reference.

Figure 2:
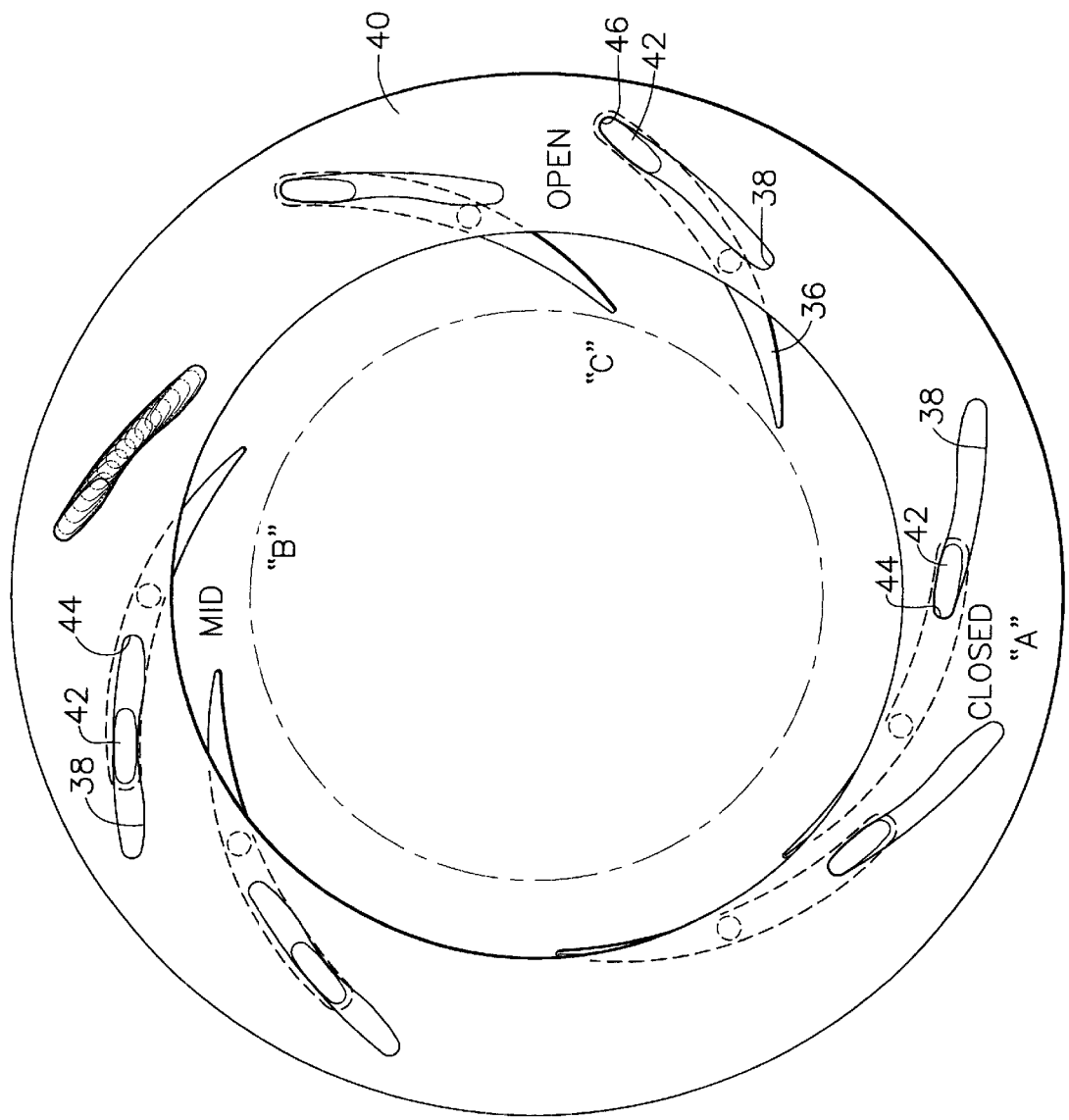
FIG. 2 is a top view of the unison ring and slots showing the engagement with the tabs on the vanes.

FIG. 2 illustrates the general movement pattern of vanes 36 when actuated by the unison ring. This movement pattern is generally the same for both known vane configurations and vane configurations prepared according to principles of this invention as used with variable nozzle turbochargers. Each vane tab 42 is disposed within a respective elongated slot 38 of a unison ring 40. In a closed position "A", the vane tab 42 is positioned adjacent a first end 44 of the slot 38. This position is referred to as a closed position because the vane is not flared radially outward, thereby serving to limit the flow of exhaust gas to the turbine. At an intermediate position "B" the unison ring 40 has been rotated a sufficient amount such that the vane tab 42 is moved within the slot 38 away from the first slot end 44 towards a middle position of the slot. The vane tab movement is provided by the pivoting action of the vane relative to the nozzle wall, allowing the vane to be rotated a given extent. At position "B" the intermediate radial projection of the vane serves to increase the flow of exhaust gas to the turbine when compared to closed position "A". At position "C" the unison ring has now been rotated to a maximum position, causing the vane tab 42 to be moved within the slot 38 to a second end 46. Again, such further vane movement is facilitated by the pivoting arrangement between the vane and the nozzle wall, allowing the vane to be rotated to a maximum open position. At position "C" the maximum radial projection of the vane serves to increase the flow of exhaust gas to the turbine when compared to the intermediate position "A".

As mentioned above in the background, proper operation of known variable nozzle turbochargers, comprising the multiple vanes as described above and illustrated in FIG. 1, requires that the vanes be permitted to pivot freely vis-a-vis the nozzle wall when actuated by the unison ring. Such free pivoting movement requires that the vane shafts not bind or otherwise be restricted in their rotational movement within their respective nozzle holes. The known vane design can produce impairments to free pivoting vane movement if the shafts projecting from the vanes are not perfectly perpendicular. Additionally, the known vane designs can produce an impairment to free pivoting vane movement by the relatively high cantilever load stress imposed on the vane by virtue of the vane shaft and hole attachment mechanism.

Figure 3:
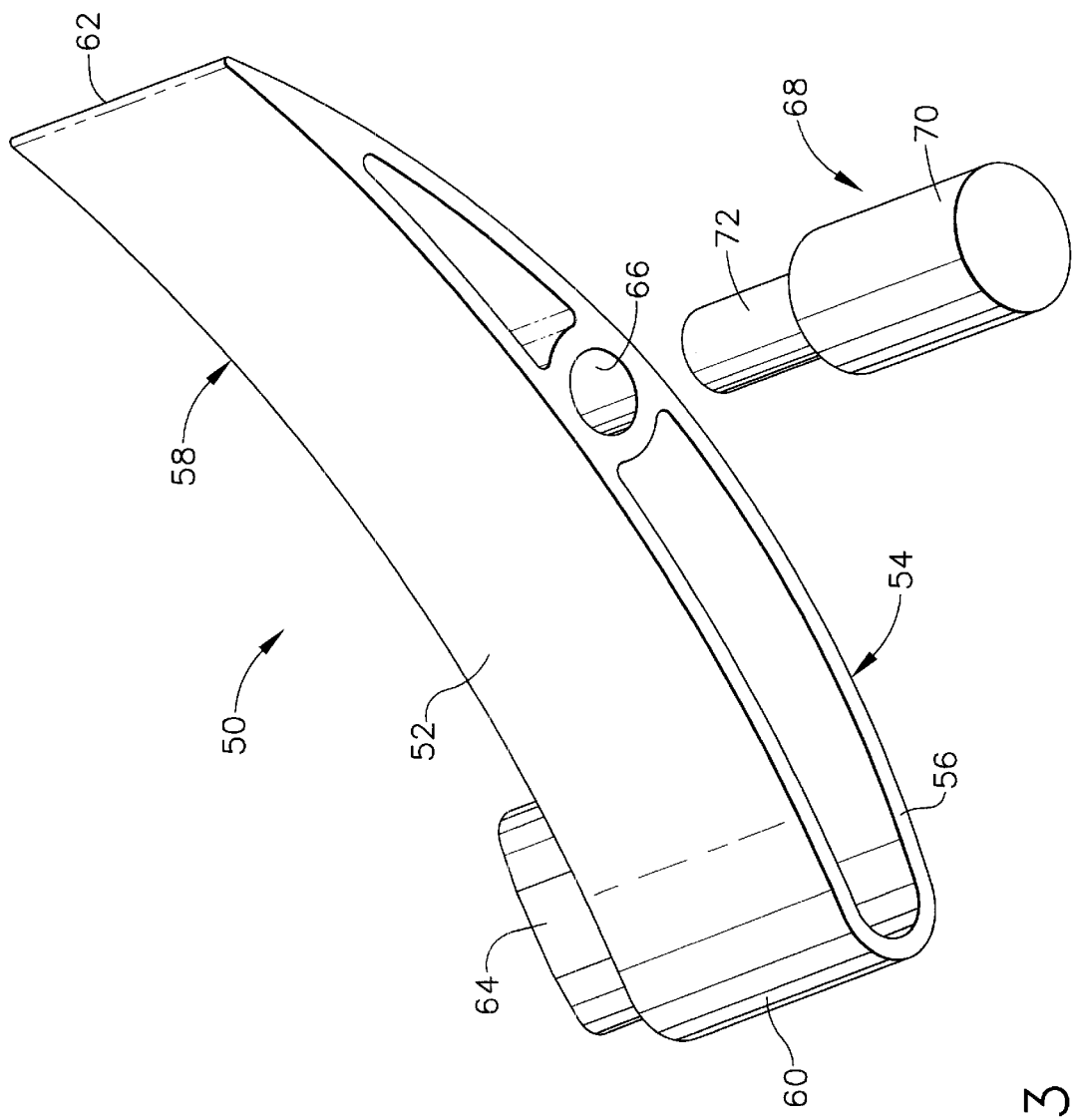
FIG. 3 is a detailed view of a vane and post incorporating the present invention.
Figure 4:
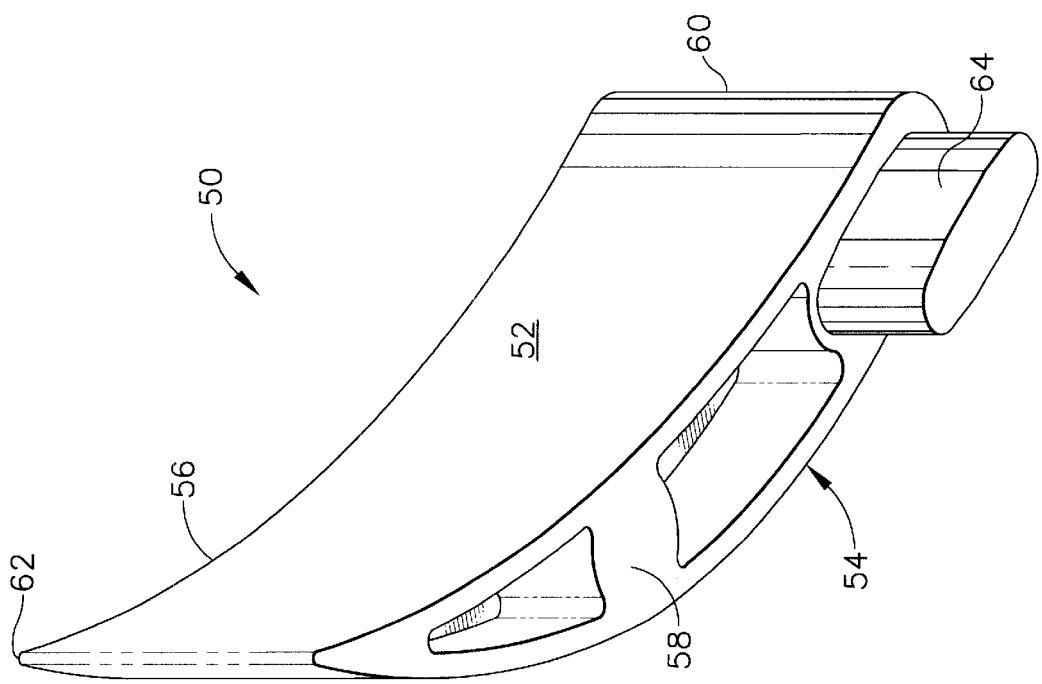
FIG. 4 is a detailed view of a vane and tab incorporating the present invention.
Figure 5:
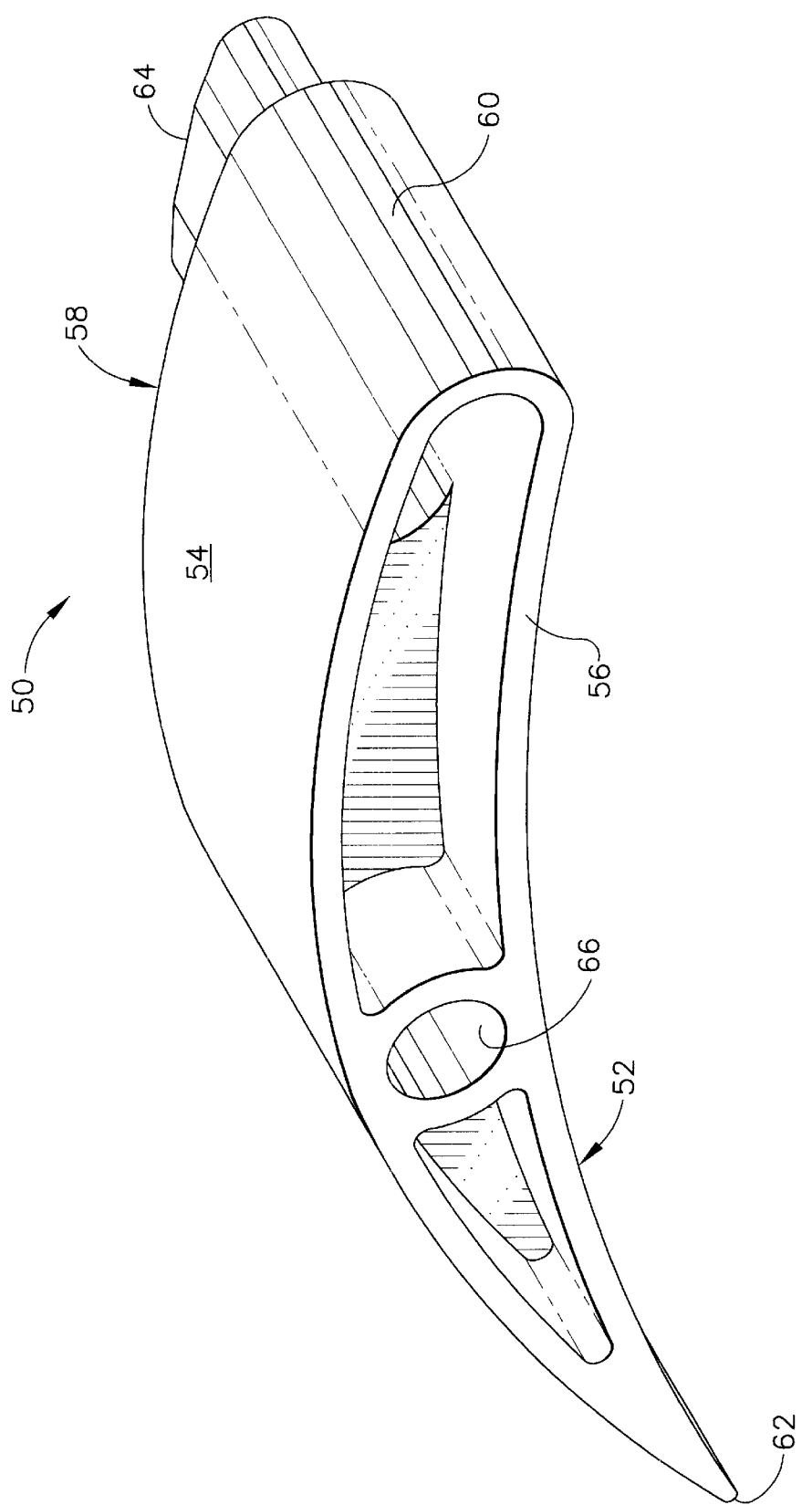
FIG. 5 is a detailed view of a vane incorporating the present invention showing the internal elements of the vane.

FIGS. 3 to 5 illustrate a vane 50 for use with a variable nozzle turbocharger, constructed according to principles of this invention, comprising an upper or low pressure airfoil surface 52, an opposite high pressure airfoil surface 54, and axial surfaces 56 and 58. These vane surfaces are defined relative to the vane placement within the turbine housing. The vane 50 includes a leading edge 60 and a trailing edge 62 at opposite common ends of the high and low pressure airfoil surfaces 52 and 54. The vane includes a tab 64 projecting outwardly away from the axial surface 58 and positioned adjacent the leading edge 60. The tab is configured to cooperate with a unison ring slot in the manner described above to facilitate vane actuation.

Referring particularly to FIGS. 3 and 5, unlike the known vane design, vanes 50 constructed according to the practice of this invention do not include a shaft. Rather, the vanes of this invention are designed having a hole 66 extending through the axial surface 56 that is sized and configured to accommodate placement of a respective post 68 therein (see FIG. 3), wherein the post projects perpendicularly outwardly away from the turbine housing nozzle wall. Configured in this manner, vane pivoting movement vis-a-vis the nozzle wall is provided by the relative rotational motion between the fixed post and the hole in the vane. The pivoting mechanism provided by the fixed wall post disposed in the rotatable vane hole reduces the amount of cantilever load stress on the vane, when compared to known vane designs and attachment mechanisms, thereby serving to reduce and/or eliminate potential impairments to efficient vane movement and operation.

Each post 68 is configured to be attached to the nozzle wall by press fit or other conventional attachment method, and is positioned within the nozzle wall in a substantially circular pattern the coincides with the desired spaced apart vane arrangement. In an example embodiment, the post 68 is configured having a stepped design with two different diameters, wherein a first enlarged diameter section 70 is sized and configured to provide a secure press fit attachment within the nozzle wall, and wherein a second reduced diameter section 72 is sized and configured to project outwardly from the nozzle wall and fit within the vane hole 66 to provide rotational movement thereupon.

The vane 50 is configured having a thickness, as measured between the high and low pressure airfoil surfaces 52 and 54, that is greater than known vane designs, to accommodate a sufficiently strong post without compromising the structural integrity of the vane. An unexpected and synergistic effect of increasing the vane thickness to accommodate the nozzle wall post is the realization of a wider area turndown ratio for a fixed rotation of the vane, when compared to turbochargers comprising the conventional prior art vanes. Therefore, vanes of this invention can provide a greater aerodynamic flow range for a fixed efficiency level than that of turbochargers comprising known vane designs.

The vane can be formed from the same types of materials, and in the same manner, as that used to form conventional prior art vanes. The vanes have a substantially solid design or are alternatively configured having a cored out design. In an example embodiment, the vane axial surfaces 56 and 58 are configured having a cored out design. The cored out design is preferred as it has been found to provide better formability, a higher stiffness to weight ratio, be more cost effective to produce, and have a reduced mass when compared to conventional prior art vanes.

Having now described the invention in detail as required by the patent statutes, those skilled in the art will recognize modifications and substitutions to the specific embodiments disclosed herein. Such modifications are within the scope and intent of the present invention.

What is claimed is:

1. A variable geometry turbocharger assembly comprising:
    a turbine housing having an inlet for exhaust gas and an outlet, a volute connected to the inlet, and an integral outer nozzle wall adjacent the volute;
    a turbine wheel carried within the turbine housing and attached to a shaft;
    a plurality of vanes disposed within the turbine housing, each vane having a hole disposed within a first axial vane surface substantially parallel to the outer nozzle wall, each vane hole receiving a respective post therein, said post projecting outwardly from the outer nozzle wall, the vanes further having actuation tabs extending from a second axial vane surface opposite from the first vane surface;
    a rotatable annular unison ring positioned axially adjacent the vanes, the unison ring having a plurality of slots each configured to accommodate a respective tab therein, wherein rotation of the unison ring causes each tab to slide within a respective slot, moving each vane radially within the turbine housing relative to the shaft, such radial vane movement being facilitated by pivoting movement of each vane about a respective post.

2. The variable geometry turbocharger assembly as recited in claim 1 wherein the each post comprises a first diameter section that extends axially from a first post end to an intermediate position on the post, and a second diameter section that is smaller in diameter than the first diameter section, the second diameter section extending axially along the post from the intermediate position to a second post end.

3. The variable geometry turbocharger assembly as recited in claim 1 wherein each vane includes an inner radial surface directed towards the turbine wheel, an outer radial surface opposite from the inner radial surface, and wherein the vane axial surfaces extend between the radial surfaces, wherein the vane axial surfaces include one or more hollow sections.

4. A variable geometry turbocharger assembly comprising: a turbine housing having an exhaust gas inlet and an exhaust gas outlet, a volute connected to the inlet, and an integral outer nozzle wall adjacent the volute, the nozzle wall comprising a plurality of posts projecting outwardly therefrom;
    a turbine wheel carried within the turbine housing and attached to a shaft;
    a plurality of vanes pivotably disposed within the turbine housing, each vane having a hole disposed within an axial vane surface positioned substantially parallel to the outer nozzle wall, each vane hole accommodating placement of a respective post therein for providing pivoting vane movement, each vane further comprising an elongated actuation tab extending outwardly from an axial vane surface opposite from the holes;
    an annular unison ring disposed within the turbine housing and positioned axially adjacent the axial vane surface of each vane providing the actuating tabs, the unison ring having a plurality of slots to accommodate a respective vane tab therein, wherein each slot is configured to provide nonrotating sliding movement of a respective tab therein; and
    means for rotating the unison ring within the turbine housing along an axis running through the shaft, wherein rotation of the ring causes the tabs to slide within respective slots and cause the vanes to move radially inwardly or outwardly relative to the shaft, such radial vane movement being facilitated by the pivoting action of each vane about a respective post.

* * * * *